United States Patent [19]

Luursema

[11] Patent Number: 4,724,360
[45] Date of Patent: Feb. 9, 1988

[54] CIRCUIT ARRANGEMENT FOR OPERATING A HIGH-PRESSURE DISCHARGE LAMP

[75] Inventor: Meerten Luursema, Eindhoven, Netherlands

[73] Assignee: U.S. Philips Corporation, New York, N.Y.

[21] Appl. No.: 864,641

[22] Filed: May 15, 1986

[30] Foreign Application Priority Data

Mar. 28, 1986 [NL] Netherlands .......................... 8600813

[51] Int. Cl.[4] ....................... H05B 37/02; H05B 41/29
[52] U.S. Cl. ...................................... 315/244; 315/82; 315/105; 315/229; 315/227 R; 315/219; 315/301; 315/306; 315/DIG. 7
[58] Field of Search ................... 315/82, DIG. 7, 244, 315/306, 301, 105, 229, 219, DIG. 5, DIG. 2, 205, 226, 227 R, 246, 272, 283

[56] References Cited

U.S. PATENT DOCUMENTS

| | | | |
|---|---|---|---|
| 4,092,564 | 5/1978 | Soileau | 315/208 |
| 4,092,565 | 5/1978 | Neal | 315/208 |
| 4,240,009 | 12/1980 | Paul | 315/DIG. 7 |
| 4,256,992 | 3/1981 | Luursema | 315/DIG. 7 |
| 4,348,615 | 9/1982 | Garrison et al. | 315/177 |
| 4,370,601 | 1/1983 | Horii et al. | 315/DIG. 7 |
| 4,392,081 | 7/1983 | Brown et al. | 315/177 |
| 4,441,053 | 4/1984 | Daspit | 315/208 |
| 4,583,026 | 4/1986 | Kajiwara et al. | 315/DIG. 7 |

Primary Examiner—David K. Moore
Assistant Examiner—Michael J. Nickerson
Attorney, Agent, or Firm—Robert T. Mayer; Bernard Franzblau

[57] ABSTRACT

A circuit for operating a discharge lamp (1) by means of a direct voltage. The circuit comprises direct voltage terminals (A,B) for connection of a direct voltage source, alternating voltage output terminals (K,L) for connection to the discharge lamp, a direct voltage/alternating voltage sine converter (3), and a current limiter (5) for limiting the current through the lamp in its operating condition. A controllable direct voltage converter (2) is coupled between the sine converter and the direct voltage input terminals.

17 Claims, 1 Drawing Figure

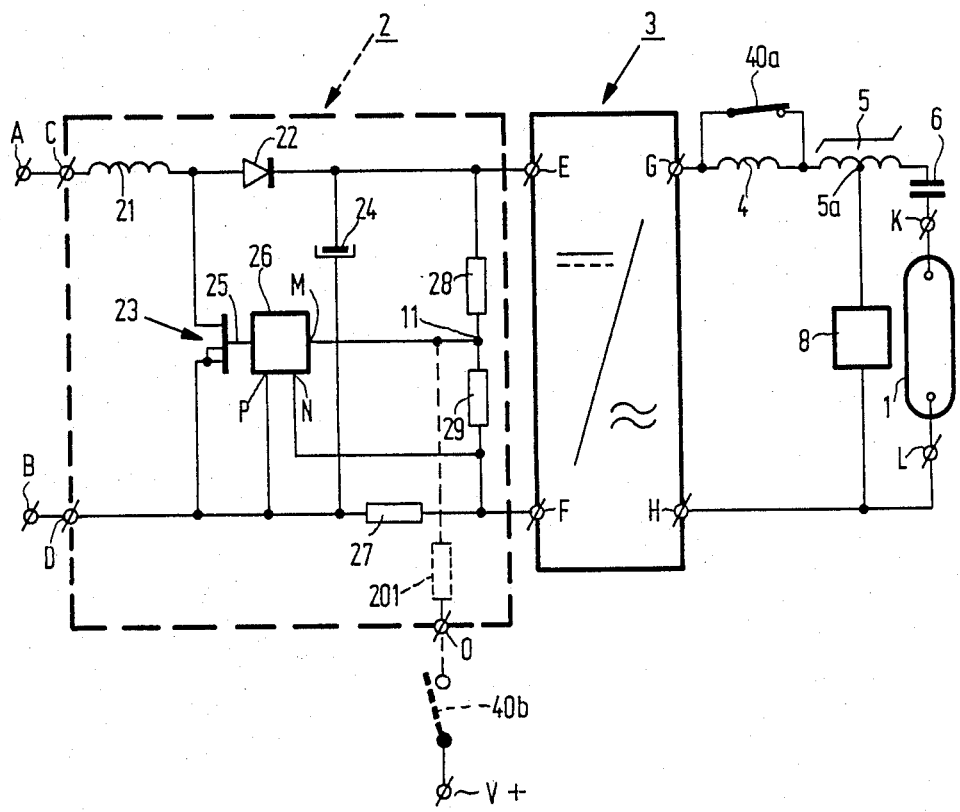

CIRCUIT ARRANGEMENT FOR OPERATING A HIGH-PRESSURE DISCHARGE LAMP

BACKGROUND OF THE INVENTION

This invention relates to a circuit arrangement for operating at least a discharge lamp by means of a direct voltage source. The circuit arrangement is provided with:
- direct voltage input terminals for connection of the direct voltage source,
- alternating voltage output terminals for connection of the discharge lamp,
- a direct voltage/alternating voltage converter and
- a current limiter for limiting the current through the lamp in the operating condition.

A circuit arrangement of the king mentioned in the opening paragraph is know from German Patent Specification No. 1,149,111. This arrangement is suitable for operating low-pressure discharge lamps in transport means. It is usual that lamps thus operated are operated at high frequency. The term "high frequency" is to be understood herein to mean a frequency of 500 Hz or higher.

Low-pressure discharge lamps are particularly suitable for illumination of the interior of a transport means and are frequently used for this purpose. However, they are not particularly suitable for use as a headlight due to their comparatively large dimensions. However, high-pressure discharge lamps are suitable for use as headlights and they have been proposed as such in the literature.

However, it is objectionable to operate a high-pressure discharge lamp with the known circuit arrangement because in the known circuit arrangement the direct voltage/alternating voltage converter supplies a rectangular alternating voltage. This may give rise to an unstable operation of the lamp due to acoustic resonances.

This disadvantage can be obviated by using a known converter which supplies a sinusoidal output voltage.

Another disadvantage of the known arrangement is that power regulation is not possible. However, in general a high-pressure discharge lamp exhibits, after starting, a transient phase before a stable operating condition is reached. During the said transient phase, a stable arc discharge is developed in the lamp after breakdown during starting, which is associated with a gradual rise of the voltage across the lamp. The transient behaviour of the lamp can be influenced by influencing the current through the lamp and hence the power dissipated in the lamp,

SUMMARY OF THE INVENTION

An object of the invention is to provide a circuit arrangement which is suitable for operating a discharge lamp as a headlight of a transport means. For this purpose, a circuit arrangement of the kind mentioned in the opening paragraph is characterized in that the direct voltage/alternating voltage converter is a sine converter and in that a controllable direct voltage converter is arranged between the direct voltage input terminals and the sine converter.

The term "sine converter" is to be understood to mean in this description and in the claims a direct voltage/alternating voltage converter, which supplies during operation a substantially sinusoidal alternating voltage. The term "direct voltage converter" is to be understood to mean a direct voltage/direct voltage converter.

The circuit arrangement according to the invention has the advantage that both a power regulation and a substantially sinusoidal output signal are obtained in a comparatively simple manner.

A further advantage is that due to the presence of the controllable direct voltage converter the circuit arrangement can be highly insensitive to spread in or variation of the value of the direct voltage of the direct voltage source to be used. This is of importance for the use of the circuit arrangement for operating a car headlight, in which use is generally made of a direct voltage source in the form of an accumulator (battery). In practice, the voltage of such accumulators can lie between about 9 V and about 15 V.

A highly sinusoidal alternating voltage signal is then of importance because for many types of high-pressure discharge lamps it appears that operation of the relevant lamps free from instabilities due to acoustic resonances is limited to comparatively narrow frequency ranges.

Direct voltage converters are well known and are generally suitable for regulation of output voltage and current. In a preferred circuit arrangement according to the invention, the direct voltage converter is an up-converter. An up-converter, also designated a boost converter or step-up converter, is known in general, inter alia, from a book entitled "Switch Mode Power Supply, Basic Theory and Design" by K. Kitsum, New York 1984. An advantage is that an up-converter derives, during operation, a continuous current from the direct voltage source. A further advantage is that the voltage supplied by the converter has a higher value than the supply voltage, as a result of which transformation in the sine converter can be limited. It should be noted that high-pressure discharge lamps used in practice mostly have an arc voltage of about 100 V.

In a further embodiment of a circuit arrangement, the current limiter is arranged between the sine converter and the alternating voltage output terminals, which has the advantage that passive elements, such as capacitors and self-inductances, can be used as the current limiter, as a result of which, while maintaining the sinusoidal waveform, the power dissipation in the current limiter can remain limited.

Preferably, the current limiter comprises a series arrangement of a self-inductance shuntable by a switch and a saturable self-inductance. The shuntable self-inductance units the current during a keep-alive state. During starting and in the operating condition, this shuntable self-inductance is short-circuited by a shunt. The saturable self-inductance serves as a current limiter in the operating condition, but permits of choosing the current during the transient phase considerably larger in comparison with the current in the operating condition while using a comparatively small increase of the alternating voltage produced in the sine converter. A large transient current is conducive to rapidly reaching the stable operating condition and hence to rapidly emitting light by the lamp.

A keep-alive state is a state in which a small current conduction is maintained through the lamp, but in which no or substantially no light is produced. The keepalive state is of importance because instantaneous light production in a high-pressure discharge lamp is possible from this state.

BRIEF DESCRIPTION OF THE DRAWING

An embodiment of a circuit arrangement according to the invention will be described more fully with reference to the drawing.

DESCRIPTION OF THE PREFERRED EMBODIMENT

The circuit arrangement comprises two direct voltage input terminals A, B for connection of a direct voltage source and two alternating voltage output terminals K, L for connection of a high-pressure discharge lamp 1. Direct voltage input terminals A, B are connected to input terminals C, D of a direct voltage converter 2, of which output terminals E, F serve at the same time as input terminals of a direct voltage/alternating voltage converter 3 constructed as a sine converter. The sine converter has output terminals G, H. A series-combination of a shuntable self-inductance 4, a saturable self-inductance 5 and a capacitor 6 is arranged as a current limiter between the output terminal G and the alternating voltage output terminal K. The shuntable self-inductance 4 is shunted by a switch 40a.

A branch 5a of the saturable self-inductance 5 is connected to a starting circuit 8, which is connected to the alternating voltage output terminal L.

The direct voltage converter 2 is constructed as an up-converter consisting of a self-inductance 21, a diode 22, a capacitor 24 and an electronic switch 23. The control electrode 25 of the electronic switch is connected to a control circuit 26. A first input terminal M of the control circuit 26 is connected to a junction 11 of a voltage divider circuit comprising resistors 28 and 29, which is connected between the terminals E and F. A second input terminal N of the control circuit 26 is connected to the terminal F. The terminal F is further connected via a measuring resistor 27 to the input terminal D. A third input terminal P of the control circuit 26 is connected to the input terminal D. The control circuit 26 controls the switches (on, off), operation of the electronic switch 23 so that the voltage at the terminals E, F can be controlled. The voltage at the terminals G, H is again dependent upon the voltage at the terminals E, F.

A broken line indicates that the input terminal M of the control circuit 26 can be connected via a resistor 201 and a switch 40b to an auxiliary direct voltage source V+.

A practical embodiment of the circuit arrangement is suitable for operating a high-pressure metal halide lamp of 35 W having a stable work-point at a voltage across the lamp of 100 V and a current through the lamp of 0.35 A. A lamp of this kind is known in a general sense from U.S. Pat. No. 4,594,529 (6/10/86) (PHN 10513).

The circuit arrangement is then connected to an accumulator as a direct voltage supply source having a voltage of about 13 V. The sine converter 3 is proportioned to this case for supplying an alternating voltage having a value lying between 200 and 300 V at a frequency of 10 kHz corresponding to a direct voltage at the input terminals E, F between 16 and 24 V.

The electronic switch 23 is constructed as a MOSFET and its control is proportional so that the voltage at the terminals E, F is 24 V as far as the current through the resistor 27 is not more than 1.7 A. With current intensities through the resistor 27 of more than 1.7 A, the control 26 ensures that the voltage at the terminals E, F satisfies the relation $9.31\ I + 1.05\ V = 41$, where:

I is the current through the resistor 27 and
V is the voltage at the terminals E, F.

The saturable self-inductance is proportioned so that in the case of a closed switch 40a and a voltage of 200 V at the terminals G, H the current is limited to 0.35 A and in the case of a voltage of 300 V at the terminals G, H the current is limited to 1 A.

The operation of the circuit arrangement is as follows. The switch 40a is closed when the lamp is started and remains closed until the keep-alive state is adjusted. After the lamp has been started by means of starting pulses produced in the starter 8, the transient phase of the lamp begins. Immediately after starting, the voltage across the lamp is about 20 V and the power consumed by the lamp is very low. During starting and initially in the transient phase, the current through the resistor 27 is also low and the control of the up-converter ensures that the voltage at the terminals E, F is a maximum, i.e. is 24 V. The voltage at the terminals G, H will therefore be 100 V, as a result of which at least during the transient phase the maximum current of 1 A will flow through the lamp. The lamp voltage will gradually increase, as a result of which the power consumed by the lamp increases. This results in an increase of the current through the resistor 27 until it has reached a value of 1.7 A. The power extracted by the circuit arrangement and the lamp from the supply source then amounts to $24 \times 1.7 = 41$ W. With an efficiency of the circuit arrangement of 0.85, this corresponds to a power consumed by the lamp of 35 W.

With a further increase of the current through the resistor 27, the control of the up-converter passes to the relation $9.31\ I + 1.05\ V = 41$ and the voltage at the terminals E, F will decrease. As a result, the voltage at the terminals G, H will also decrease. At the same time, the voltage across the lamp further increases to the voltage associated with the stable work-point, i.e. 100 V. The saturable self-inductance thus comes out of its saturation and limits the current through the lamp. This course is continued until the lamp has reached its stable work-point corresponding to a current through the lamp of 0.35 A and a voltage across the lamp of 100 V. The voltage at the terminals G, H is then 200 V and that at the terminals E, F is 16 V, while the current through the resistor 27 is about 2.6 A.

With the operation described, it has been found that in practice a regulation for operating the lamp with a constant power is realized on close approximation, although the relation $9.31I + 1.05\ V = 41$ deviates from an exact constant power relation ($I \times V$ = constant). Due to the combination of the sine converter, an acceleration of the transient phase is also obtained, which has the advantage that the lamp more rapidly produces light.

In case the lamp is brought into the keep-alive state, this is effected after the lamp has traversed the transient phase. When the switch 40a is opened, the self-inductance 4 is connected in series with the lamp, as a result of which the lamp current decreases. The value of the self-inductance 4 in the example described is 42 mH and the lamp current then becomes 0.12 A.

A decrease of the lamp current results in that ionization in the lamp is maintained, but that no or substantially no light is produced. The power consumed by the lamp in combination with the self-inductance 4 and 5 also decreases, as a result of which the control of the up-converter will cause the voltage at the terminals E, F and hence at the terminals G, H to increase. In order to avoid that a high voltage of long duration at the terminals G, H will form an overload for the sine converter, an auxiliary voltage V+ is applied via the resistor 201 and the switch 40b to the junction 11 of the voltage divider circuit 28, 29. The application of the auxiliary voltage V+ will result in that the voltage at the terminals E, F and hence the voltage at the terminals G, H decreases. In the example described, the auxiliary voltage V+ and the resistor 201 are chosen so that in the keep-alive state a voltage of 262 V is applied to the terminals G, H. The switch 40b will be closed when the switch 40a is opened and will be opened when the switch 40a is closed.

What is claimed is:

1. A circuit arrangement for operating a high pressure discharge lamp by means of a direct voltage source comprising:
   direct voltage input terminals for connection to the direct voltage source;
   alternating voltage output terminals for connection to the discharge lamp,
   a direct voltage/alternating voltage sine converter,
   a current limiter for limiting the current through the lamp in the operating condition,
   a controllable direct voltage converter including a controlled semiconductor element having a control electrode coupled to a control circuit which controls the operation of the controllable direct voltage converter by means of said semiconductor element, and
   means coupled the controllable direct voltage converter between the direct voltage input terminals and the sine converter.

2. A circuit arrangement as claimed in claim 1, wherein the direct voltage converter is an up-converter.

3. A circuit arrangement as claimed in claim 2, wherein the current limiter is connected between the sine converter and the alternating voltage output terminals.

4. A circuit arrangement as claimed in claim 3, wherein the current limiter comprises a parallel arrangement of a self-inductance and a switch in series with a saturable self-inductance.

5. A circuit arrangement as claimed in claim 1 wherein the current limiter is connected between the sine converter and the alternating voltage output terminals.

6. A circuit arrangement as claimed in claim 5 wherein the current limiter comprises a parallel connection of an inductor and a switch connected in series circuit with a saturable inductor.

7. A circuit for operating a high pressure discharge lamp from a low voltage source of DC voltage comprising:
   a pair of input terminals for connection to the DC voltage source,
   a pair of output terminals for connection to the discharge lamp to supply the lamp with a sinusoidal alternating voltage,
   a current limiter for limiting lamp current in the operating condition of the lamp,
   a controllable direct voltage converter connected in cascade with a direct voltage/alternating voltage sine converter between said input terminals and said output terminals in the order named, and
   a control circuit coupled to a control terminal of the controllable direct voltage converter for controlling the operation thereof.

8. A circuit as claimed in claim 7 wherein the current limiter is connected between one output terminal of the sine converter and one of said output terminals.

9. A circuit as claimed in claim 8 wherein said controllable direct voltage converter includes a semiconductor controlled switching element controlled by a signal at the control terminal of the controllable direct voltage converter, and
   said control circuit has an input for receiving a voltage determined by the output voltage of the controllable direct voltage converter thereby to supply a control signal to the control terminal of the controllable direct voltage converter to control the operation thereof as a function of said output voltage.

10. A circuit as claimed in claim 9 wherein said control circuit has a second input for receiving a signal determined at least in part by the level of lamp current, said control signal supplied by the control circuit further controlling the operation of the controllable direct voltage converter as a function of lamp current.

11. A circuit as claimed in claim 8 wherein the controllable direct voltage converter is an up-converter.

12. A circuit as claimed in claim 8 wherein the current limiter comprises a parallel connection of an inductor and a switching device connected in series circuit with a saturable reactor.

13. A circuit as claimed in claim 12 wherein the switching device is part of a switching means including a second switching device operated in synchronism with the first switching device so that when one switching device is closed the other switching device is open, and vice versa, said second switching device when closed coupling an auxiliary voltage to a control input of the control circuit, said switching means being operative to open the first switching device and close the second switching device to provide a keep-alive state for a lamp when connected to said output terminals wherein a low value ionization current will flow through a connected lamp.

14. A circuit as claimed in claim 12 wherein the switching device is closed during the start-up phase of a connected lamp and during the operating condition of said lamp and when open provides a keep-alive state for the lamp wherein a low ionization current will flow through the lamp.

15. A circuit as claimed in claim 7 wherein said control circuit includes input means responsive to the output voltage of the controllable direct voltage converter and responsive to a current drawn from said input terminals by the circuit thereby to provide power regulation of a connected lamp by control of the output voltage of the controllable direct voltage converter.

16. A circuit as claimed in claim 7 wherein the lamp is a headlight for a motor vehicle or the like and said input terminals connect to a vehicle battery operative as the DC voltage source.

17. A circuit as claimed in claim 7 wherein the sine converter supplies a continuous high frequency sinusoidal current to a lamp connected to the output terminals.

* * * * *